United States Patent Office 3,094,554
Patented June 18, 1963

3,094,554
AMINO ACRYLATE ESTERS
Jack Dickstein, Huntingdon Valley, Pa., and Michael Bodnar, Dover, and Rose-Marie Hoegerle, Linden, N.J., assignors to The Borden Company, New York, N.Y., a corporation of New Jersey
No Drawing. Filed Feb. 20, 1961, Ser. No. 90,178
6 Claims. (Cl. 260—482)

This invention relates to 2-aminoalkylacrylate esters and the process of making them.

The formula for our esters may be written as

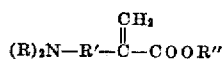
$$(R)_2N-R'-\overset{CH_2}{\underset{\|}{C}}-COOR''$$

in which R is a monovalent component selected from the group consisting of hydrogen and $C_1$—$C_{12}$ alkyls, R' is a bivalent hydrocarbon group having 1–3 carbon atoms, and R'' is a monovalent radical selected from the group consisting of $C_1$—$C_8$ alkyls, allyl and phenyl.

Examples of compounds that illustrate the invention and meanings of the several R's, in order, from left to right are the following:

Ethyl 2-aminomethylacrylate $$NH_2-CH_2-\overset{CH_2}{\underset{\|}{C}}-COOC_2H_5$$

Tri-(ethyl 2-methylenepropionate) amine

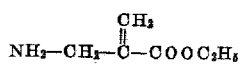
$$N(CH_2-\overset{CH_2}{\underset{\|}{C}}-COOC_2H_5)_3$$

Ethyl 2(N,N-dimethylaminomethyl)-acrylate

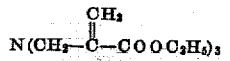
$$(CH_3)_2N-CH_2-\overset{CH_2}{\underset{\|}{C}}-COOC_2H_5$$

Ethyl 2-(N,N-diethylaminomethyl)-acrylate

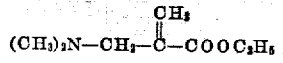
$$(C_2H_5)_2N-CH_2-\overset{CH_2}{\underset{\|}{C}}-COOC_2H_5$$

Ethyl 2-(N,N,N-triethylammoniummethyl)acrylate bromide

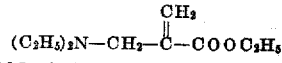
$$(C_2H_5)_3\overset{Br}{\underset{|}{N}}-CH_2-\overset{CH_2}{\underset{\|}{C}}-COOC_2H_5$$

The products of this invention are useful as polyelectrolytes for controlling the viscosity of aqueous solutions to which they are added. Effectiveness for this purpose requires a high content of the hydrocarbon moiety which is supplied by the various R's in the formula shown. Also the products are useful as surface active agents as in detergents, particularly when the several R's have carbon atoms in numbers that are relatively high within the ranges recited for the various R's. The polyelectrolytes and the surface active agents are used in the form of salts such as made by reaction of compounds of the formula shown with a monoalkyl bromide or the like, as to form a quaternary ammonium compound and develop cationic properties in the product.

The invention comprises the 2-aminoalkylacrylate esters of the formula above and their salts.

The invention comprises also the process of making the compounds of kind described by action of ammonia or an amine containing the R on the 2-bromoalkylacrylate ester providing the R' and R'' groups that are to appear in the finished product.

The 2-bromoalkylacrylate ester of kind described and of the formula

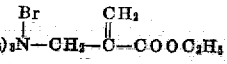
$$BrR'-\overset{CH_2}{\underset{\|}{C}}-COOR''$$

is reacted in the cold with an excess of ammonia or an amine in alcohol or like solvent. Unless other alkali is added, the ammonia or the amine is used in amount to correspond at least to 2 moles for 1 mole of the bromoalkylacrylate used. The reaction involves one bromine containing group of the ester, thus

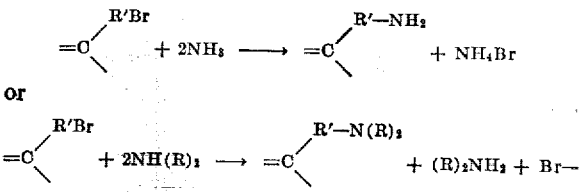

or $$=C\diagup^{R'Br}_{\diagdown} + 2NH(R)_2 \longrightarrow =C\diagup^{R'-N(R)_2}_{\diagdown} + (R)_2NH_2 + Br-$$

In the first of these reactions R is H.

When the alkalinity has decreased to a substantially constant level or when the bromide ion content of the reaction mixture has risen to a substantially constant level, either of which condition is determinable by analysis, then the reaction is considered complete. At this time the desired aminoalkylacrylate ester will be in the form of a precipitate. A small amount of water is added to promote solution of any ammonium or alkylammonium bromide that may also be undissolved and the aqueous solution so formed is filtered away from the 2-aminoalkylacrylate ester that remains.

This process is illustrated more specifically by the several examples later herein which also show purification steps for separating the esters so obtained from foreign materials. Thus the 2-aminoalkylacrylate ester may be dissolved in water containing hydrochloric or other acid in amount to convert the amino group of the ester to a salt, the resulting salt solution filtered from any material remaining undissolved by the acid solution, and the filtrate then neutralized with an aqueous solution of calcium carbonate or other alkali which destroys the salt and precipitates the 2-aminoalkylacrylate ester in nonsalt form, i.e., the hydroxide form. This product is then extracted by ether, the ether extract separated by difference of specific gravity from the aqueous phase, and the ether distilled way.

As the alkali which combines with the hydrogen bromide, formed as a byproduct in the replacement of bromine by the $-N(R)_2$ group, we use the second mole of the amine or of ammonium. To spare a part or all of the second mole, however, we may introduce an equivalent proportion of an inorganic water soluble alkali as, for example, sodium, potassium or lithium carbonate.

The temperature of the reaction mixture may be raised to accelerate the replacement of the bromo group. This rise will be automatic unless extreme cooling is used since the reaction is exothermic. We find no advantage in the use of elevated temperatures that offsets the disadvantages in their use and prefer to work in the cold, as at about $-20°$ to $20°$ C.

As the solvent in which the bromo compound and the amine or ammonia are reacted we find anhydrous ethanol to be satisfactory as well as economical. In place of it we may use any other liquid that is a solvent for the reactants but a precipitant for the resulting amino compound.

Examples of such other solvents that we can use are methanol, isopropanol, dioxane, chloroform, and carbon tetrachloride.

The amount of solvent used is variable. An amount sufficient to maintain in solution at the start the bromoalkylacrylate ester and the ammonia or the amine used is convenient and beneficial.

The bromo-substituted esters which serve as intermediates in our synthesis are made in any conventional manner. A satisfactory method is that illustrated as follows:

To prepare ethyl 2-bromomethylacrylate, for instance, 20 g. sodium sand was made in xylene, washed with tetrahydrofuran and then covered with 230 g. tetrahydrofuran. This was then mixed and reacted with stirring with 200 g. ethylene glycol. After the vigorous reaction had ceased, the resulting solution was maintained at reflux temperature, until all sodium had completely disappeared and reacted with the ethylene glycol.

Two phases were formed: a lower, brown ethylene glycol phase containing the sodium ethylene glycoxide and an upper one consisting mainly of tetrahydrofuran. Both layers were slowly added to a stirred solution of 196 g. ethyl 3,3'-dibromoisobutyrate in 300 g. tetrahydrofuran, at such a rate that the temperature was maintained at 35°–38° C. The stirring was continued for an additional 1.5 hrs. at room temperature. Then, the reaction mixture was poured into 100 g. ice-cooled water and the organic material extracted with methylene chloride. The combined organic solutions were dried, filtered, and evaporated under reduced pressure to give an oily residue which upon further distillation yielded a colorless liquid (105.5 g., 77%), B.P. 61–63° (3.6 mm.), $n_D^{25}$ 1.4755. The formula for this product is:

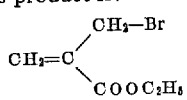

Other bromoalkylacrylates are prepared in like manner, i.e., by the substitution of ethyl 3,3-dibromoisobutyrate by an equimolar proportion of the dibromo compound containing the alkyl and acid group that are to appear in the ester.

The invention will be further illustrated by description in connection with the following examples. Unless specifically stated to the contrary, the dryings were effected over anhydrous magnesium sulfate and proportions, here and elsewhere herein, are expressed as parts by weight.

*Example 1—Ethyl 2-(N,N-Dimethylaminoethyl)acrylate*

137.5 ml. of a 1.45 N solution of dimethylamine in methanol was added to 91.3 g. ethyl 2-bromomethylacrylate dissolved in 50 ml. methanol with rapid stirring at a temperature of 10°–15° C. A colorless precipitate separated, after which the mixture was stirred at room temperature for an additional 0.5 hr. and then stored overnight in the refrigerator. The mixture was acidified with an ether solution of hydrochloric acid to pH about 5–6 and the solvents evaporated in vacuo. The residue was dissolved in ice water, mixed with potassium carbonate in amount to give pH 8 and the alkalized product extracted with ether. The combined ether extracts were dried and then evaporated, to leave an oil. Vacuum distillation gave a colorless oil with strong basic properties: B.P. 75° C. (12 mm.), $n_D^{23}$ 1.4375, $d_{20}^{23}$ 0.919.

*Analysis.*—Percent, calculated for $C_8H_{15}NO_2$: C, 61.16; H, 9.62; N, 8.92. Found: C, 61.06; H, 9.64; N, 8.80.

Infrared absorption spectrum: 1640, 950, 815$^{-1}$, showing

The picrate prepared in ether and recrystallized melted at 79° C.

*Analysis.*—Calculated for $C_{14}H_{18}N_4O_9$: C, 43.52; H, 4.70; N, 14.50. Found: C, 43.51; H, 4.76; N, 14.70.

The hydrochloride was prepared in ethanol with a solution of hydrochloric acid in ether. It gave colorless, very hygroscopic plates of M.P. 93° C.

While the picrate and the hydrochloride were prepared as means of confirming the identity of the amino ester, they are examples of salts of the amino esters that are within the scope of the invention and that have particular uses, as for instance use of the picrate as an anionic dye and the hydrochloride and a cationic surfactant.

*Example 2—Ethyl 2-(N,N-Diethylaminoethyl)acrylate*

9.6 g. ethyl 2-bromoethylacrylate in 16 g. absolute etnanol were reacted with an ethanolic solution of 7.3 g. diethylamine in 4 g. ethanol at a temperature of −10° C. An exothermic reaction occurred and a white precipitate separated.

The reaction mixture was allowed to stand for 19 hrs. in the refrigerator. The amines were then isolated by dissolving the ethanolic solution and the precipitate in a small amount of water, making it alkaline with potassium carbonate, as to pH 10, and extracting the basic material with ether. Evaporation of the dried and filtered ether extracts yielded an oily base. This oily base, ethyl 2-(N,N-diethylaminoethyl)acrylate, was distilled in the amount of 4.1 g. (45% theory), B.P. 55°–56° C. (1.0 mm.), $n_D^{22}$ 1.4411, $d_{20}^{23}$ 0.904.

Infrared absorption spectrum: 1643; 950; 820 cm.$^{-1}$ showing

The picrate, prepared in ether and recrystallized from ethanol, melted at 91°–92° C.

*Analysis.*—Percent calculated for $C_{16}H_{22}N_4O_9$: C, 46.37; H, 5.35; N, 13.52. Found: C, 46.21; H, 5.27; N, 13.62.

*Example 3.—Tri-(Ethyl 2-Methylenepropionate) Amine*

19.3 g. ethyl 2-bromomethylacrylate were dissolved in 40 g. ethanol and reacted slowly with a solution of 3.3 g. ammonia in 89 g. ethanol at 0°–5° C. After 20 hrs. at 4°, the reaction mixture was acidified with an ether solution of hydrochloric acid to pH below 7, as to 4–5, and then evaporated to dryness in vacuo. The residue was dissolved in 35 g. water and extracted with ether after saturation of the aqueous phase with potassium bicarbonate. The removal of the solvent from the combined ether extracts by evaporation gave 9.2 g. (78% of theory) of a slightly yellow oil which could not be distilled in vacuo and which decomposed at a temperature of 200°–230° C. The analysis showed that it was tri(ethyl 2-methylenepropionate) amine.

A nitrogen determination was made of the crude base obtained.

*Analysis.*—Percent calcd. for $C_{18}H_{27}NO_6$: N, 3.96. Found: N, 3.65.

The fact that the reaction product isolated was a tertiary amine was also shown by its failure to form a p-nitro-benzoyl derivative when treated with an equivalent weight of p-nitro-benzoyl chloride in pyridine. In the same manner, treatment of the product with an excess of acetic anhydride at room temperature for 20 hrs. did not yield an acetyl derivative.

*Example 4.—Ethyl 2-Aminomethylacrylate*

The procedure and composition of Example 1 were followed except that the dimethyl amine there used is replaced by an equimolar proportion of ammonia. The final product is ethyl 2-aminomethylacrylate.

*Example 5.—Ethyl 2-(N,N,N-Triethylammonium Methyl)Acrylate Bromide*

There was mixed 10.1 g. triethylamine and a solution of 9.7 g. ethyl 2-bromomethylacrylate in 67 g. benzene at room temperature. An exothermic reaction occurred and a colorless oil separated which crystallized into long needles after a few minutes. The reaction mixture was vigorously shaken from time to time and then stored at room temperature for 5 hrs. The precipitate that resulted was filtered and dried under reduced pressure at 20° C., to provide 13.8 g. (96% of theory) of colorless crystals of ethyl 2-(N,N,N-triethylammonium methyl acrylate) bromide of M.P. 97°–100° C. This quaternary product is very soluble in water, methanol and acetone and insoluble in less polar solvents such as ether and petroleum ether. An aqueous solution of the quaternary product with silver nitrate gave an immediate heavy precipitate of silver bromide. The microanalysis of the product showed its high purity.

*Analysis.*—Percent calcd. for $C_{12}H_{24}NO_2Br$: C, 48.98; H, 8.22; N, 4.76. Found: C, 49.14; H, 8.48; N, 4.97.

The composition and procedure of this example are used except that the triethylamine was replaced, in turn, by an equimolar weight of any of the other amines disclosed herein for reaction with the 2-bromoalkylacrylate ester.

In another modification of this example, the 2-bromoalkylacrylate ester is replaced, in turn, by an equimolar weight of the corresponding chloro- and iodo-esters.

There are thus made a class of quaternary ammonium compounds in which in effect an alkyl halide is combined with the nitrogen, thus

$R'''$ is a $C_1$—$C_8$ alkyl.

The product is of formula shown earlier herein. It is not only an effective polyelectrolyte but also an active cationic surfactant suitable for use as such in detergents and other surface tension lowering compositions.

*Example 6*

The procedure of Example 5 is followed except that the triethylamine there used is replaced, in turn, by an equimolecular weight of higher homologs such as tripropyl, tributyl, trioctyl or other $C_3$—$C_{10}$ alkyl amines. The increased proportion of hydrocarbon component in the tertiary amine so made gives a product having improved surface active properties adapting it particularly well for use as a detergent.

*Example 7*

The procedure and composition of Example 1 are used except that the dimethyl amine there used is replaced in turn by ammonia or any $C_1$—$C_8$ alkyl substituted amine, either mono- or di- other than the dimethyl amine. Examples are monomethyl amine, diisopropyl amine, isopropyl methyl amine, mono- or dioctyl amine, bromoamyl amine, tribromohexyl amine, and ethyl bromobutyl amine.

*Example 8*

The procedure of Example 1 is followed except that the ethyl 2-bromomethylacrylate there used is replaced, in turn, by an equimolar proportion of the methyl-, isobutyl-, and allyl-, 2-bromomethylacrylate or by 2-bromopropyl- or 2-bromoisopropylacrylate.

*Example 9*

The final product of Example 5, namely ethyl 2-(N,N,N-triethylammonium methyl)acrylate bromide was polymerized by being warmed at 100° C. with 1% of benzoyl peroxide as the initiator of polymerization. The polymer so formed is a polyelectrolyte. As such it is useful as a thickening agent and as a brightener in conventional electroplating operations. When dissolved in aqueous solvents, the polyelectrolyte gives solutions of viscosity that is high and can be lowered as desired and gradually, by the addition of the bromide ion as, for example, by admixing any alkali metal bromide.

In a modification of this example, the final acrylate products of Examples 1–4 and 6–8 are used separately and in turn. Each is mixed with an equivalent amount of an aqueous solution of a hydrohalide, examples of which are hydrochloric and hydrobromic acids, in amount to neutralize the amino groups in the acrylate used.

The resulting salts are useful as polyelectrolytes in the manner described.

*Example 10.—Use as Ion Exchange Resins*

The aminoalkylacrylate esters described herein are useful also as ion exchange resins. For this purpose, the said esters, are adjusted to the alkaline cycle, as by treatment with a solution of sodium or potassium hydroxide. The alkalized product is washed with water and brought into contact with an aqueous solution of the anions which are to be exchanged. After the contact has been maintained for a reasonable period of time, as by slow percolation of the anions over the alkalized product in granular form, the said anions are exchanged for the anion originally on our alkalized product.

Subsequent separations and restoration of the amino acrylate compound to the cycle for reuse are effected in any manner that is conventional in the art of using ion exchange resins.

*Example 11.—Use as Detergents*

The ethyl 2-(N,N-dimethylaminomethyl)acrylate ester produced in Example 1 is dissolved in water in the proportion of about 0.1% of the ester on the weight of the water, into which water there had been mixed in advance a quantity of a mineral acid equivalent to the amino group or groups in the arcylate. Examples of such mineral acids that we use are hydrochloric, hydrobromic, sulfuric, and phosphoric acids.

In a modification of this Example, the other aminoalkyl acrylate esters disclosed herein, as the final product of Examples 2–8, are separately substituted in equivalent proportion by weight for the said ester. In each case the acid forms a salt with the amine group.

These salts, as detergents, may be used alone or may be compounded with phosphates, soap builders, fillers and the like that are usual in such compositions as, for instance, with sodium tripolyphosphate or other sodium phosphate and sodium sulfate, in proportions that are usual in detergents.

Another use of the aminoalkyl acrylates of this invention is as base catalysts, as in curing epoxide resins such as epoxidized 4,4′-dihydroxyphenylpropane or in accelerating the condensation of such epoxide compounds with lauryl alcohol, nonylphenyl, or like alcohols and phenols.

It will be understood that it is intended to cover all changes and modifications of the examples of the invention herein chosen for the purpose of illustration which do not constitute departures from the spirit and scope of the invention.

We claim:
1. Ethyl 2-aminomethylacrylate.
2. Tri-(ethyl 2-methylenepropionate) amine.
3. Ethyl 2(N,N-dimethylaminoethyl)acrylate.
4. Ethyl 2-(N,N-diethylaminomethyl)acrylate.
5. Ethyl 2-(N,N,N-triethylammoniummethyl)acrylate bromide.
6. The ester of the formula

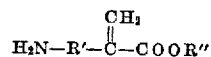

in which R′ is a bivalent hydrocarbon group having 1–3 carbon atoms, and R″ is a $C_1$—$C_8$ alkyl.

References Cited in the file of this patent

Pelletier et al.: J. Org. Chem. 17, 855–859 (1952), cited in Chem. Abs. 47, 1952(b) 1953.

Chemical Abstracts 52, 1118c (1958).

UNITED STATES PATENT OFFICE
CERTIFICATE OF CORRECTION

Patent No. 3,094,554                June 18, 1963

Jack Dickstein et al.

It is hereby certified that error appears in the above numbered patent requiring correction and that the said Letters Patent should read as corrected below.

Column 3, line 36, for "2-(N,N-Dimethylaminoethyl)-acrylate" read -- 2-(N,N-Dimethylaminomethyl)acrylate --.

Signed and sealed this 30th day of June 1964.

(SEAL)
Attest:

ERNEST W. SWIDER                EDWARD J. BRENNER
Attesting Officer              Commissioner of Patents